Dec. 27, 1966  H. L. GERBER ET AL  3,293,973
MAGNETIC IMPULSE SEVERING APPARATUS
Filed Oct. 6, 1964  2 Sheets-Sheet 2
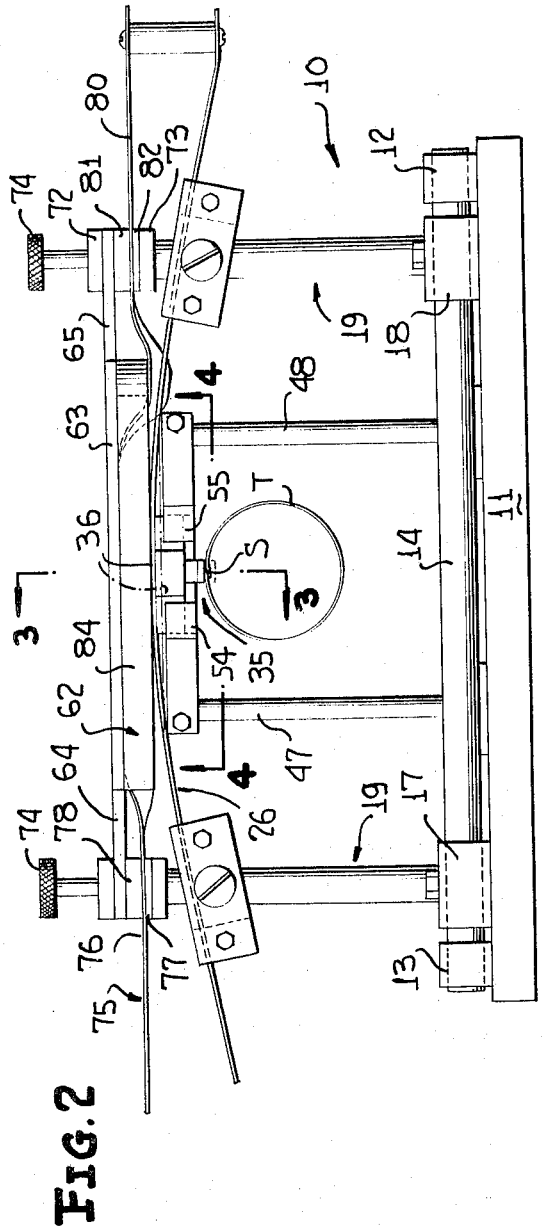
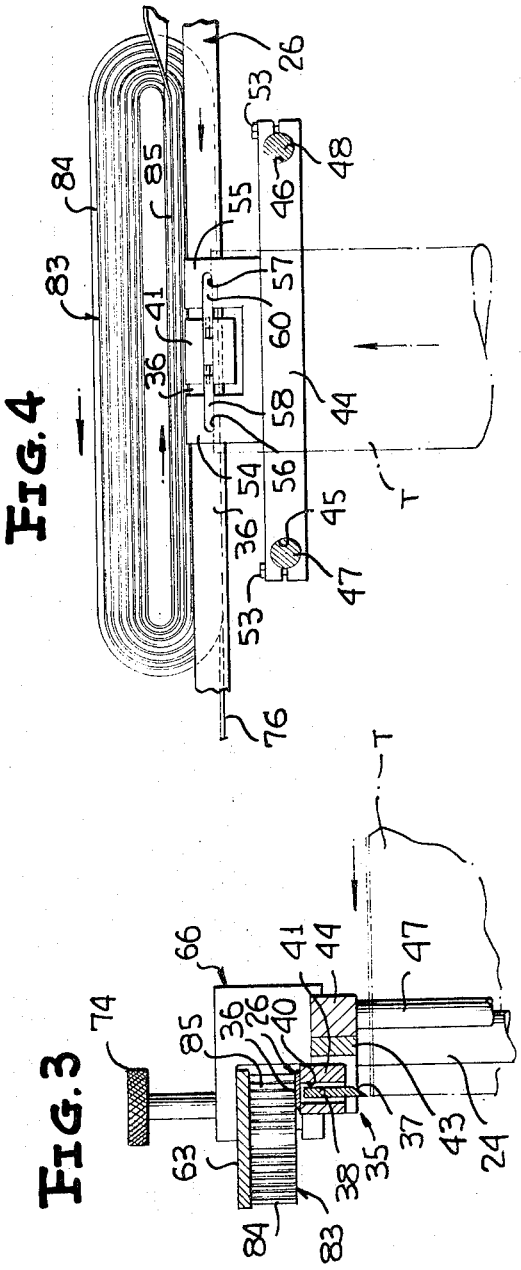
INVENTORS
HOWARD L. GERBER
& BERNARD R. JUSKIE
BY
ATTORNEYS

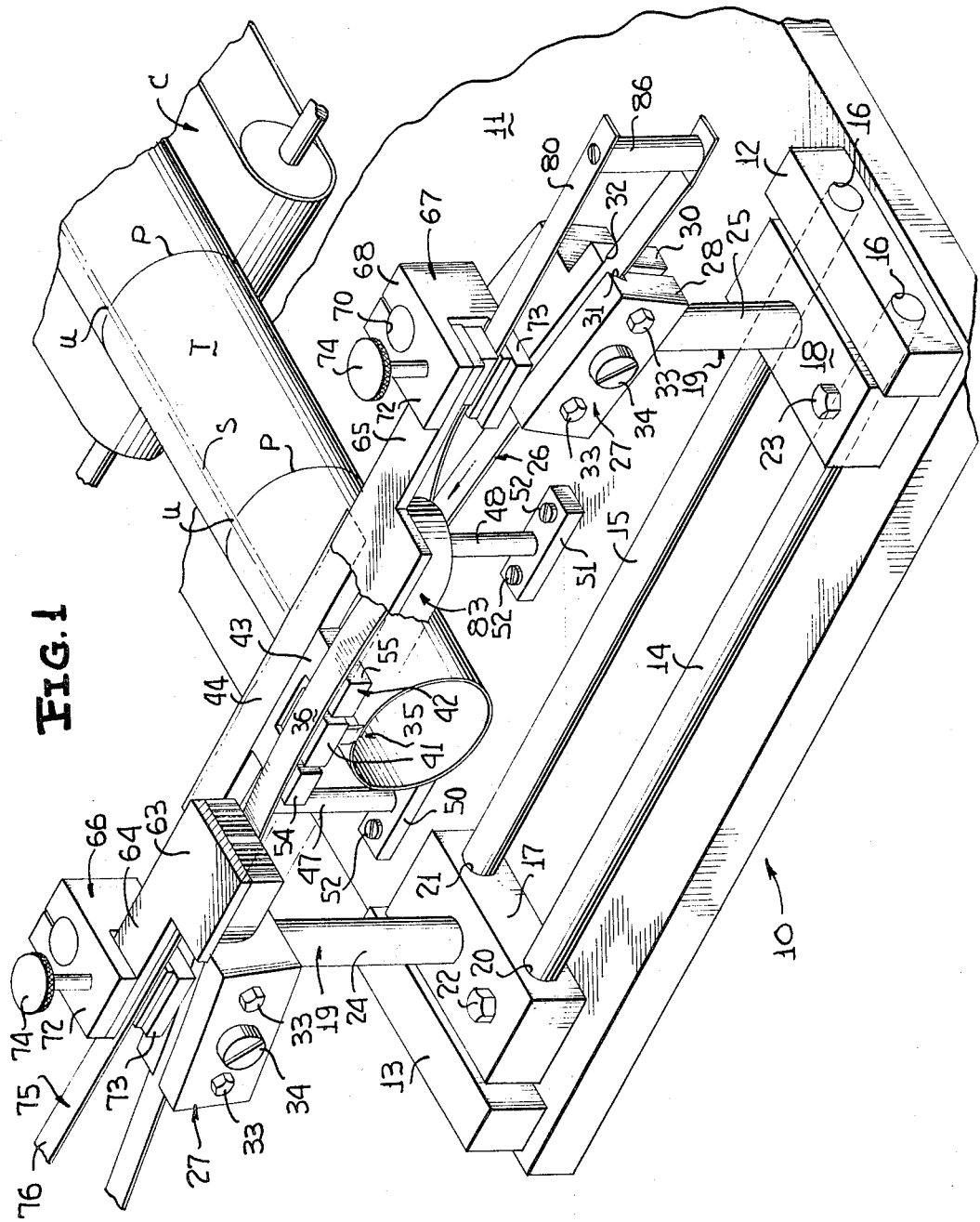

3,293,973
MAGNETIC IMPULSE SEVERING APPARATUS
Howard L. Gerber, Chicago, and Bernard R. Juskie, Oak Forest, Ill., assignors to Continental Can Company, Inc., New York, N.Y., a corporation of New York
Filed Oct. 6, 1964, Ser. No. 401,803
21 Claims. (Cl. 83—542)

This invention relates to a novel apparatus for severing partially circumferentially score tubing to form can bodies therefrom and is particularly directed to an apparatus which includes a bowed conductor carrying a severing device positioned above a predetermined path of travel of the tubing, and a coil positioned above the bowed conductor whereupon energization of the coil creates a magnetic field whose forces repel the bowed conductor and the severing means carried thereby toward the predetermined path into contact with unscored portions of the tubing thus completely severing a can body from the tubing along each of the partially scored portions thereof.

At the present time there has been devised suitable apparatus for continuously welding tubing from a metallic strip which may be provided on a continuous basis. However, once the strip has been formed into a tube or tubing it must be separated into can body lengths in an economically feasible manner. It is to this that the present invention relates.

It is known to form tubing by bringing longitudinal edge portions of a metallic strip into overlapping or abutting relationship and form a longitudinal seam by, for example, a forge welding operation. Atfer the tubing has been longitudinally seamed diverse shearing mechanisms are employed to conventionally sever the tubing into can body lengths. One such mechanism is a conventional flying shear which reciprocates in the direction of travel of the tubing and, through appropriate means, it is moved in a transverse direction in relation to the tubing during a severing operation to sever the tubing into discrete can bodies. Such conventional flying shears include numerous inherent disadvantages. For example, extremely accurate synchronization must be maintained between the speed of travel of the tubing, the reciprocal movement of the flying shear relative to the tubing, and the transverse cutting movement and withdrawal movement of the shear. A loss of synchronism between the direction of tubing travel and the reciprocal movement of the flying shear in a direction paralleling the direction of tubing travel results in can bodies of varied lengths, while a failure in synchronism during the transverse movement of the flying shear during the severing of the tubing results in the formation of can bodies whose severed edges are ragged and beveled. In either of these cases subsequent flanging and end seaming operations cannot be effectively performed as a result of the different can body lengths and irregular edge portions.

It has also been proposed to partially circumferentially score continuous tubing and transport such partially scored tubing along a generally horizontal predetermined path of tubing travel which includes a portion in angular relationship to the generally major horizontal path portion. As the partially circumferentially scored tubing passes from the horizontal path to the angular path, the tubing cracks along the partially circumferentially scored portions and across the unscored seam of the tubing, thus forming individual can bodies. While such apparatus overcomes many of the disadvantages inherent in flying shears and other conventional cutting mechanisms, a major disadvantage is the irregular cracking of the tubing across the unscored portions which, again, results in irregular can body edge portions.

In accordance with the above, it is a primary object of this invention to provide a novel apparatus for severing an unscored portion of a partially circumferentially scored tube to form discrete can bodies in a manner heretofore unprovided for by the prior art including means for supporting and transporting a generally continuous tube along a predetermined path of travel, first and second means for conducting current in opposite directions supported above the predetermined path whereby one of the conducting means is movable relative to the other of the conducting means and toward the tubing transported by the support means upon current flow through the conducting means, and severing means carried by one of the conducting means to sever unscored portions of the tubing to form can bodies therefrom.

A further object of this invention is to provide a novel apparatus for severing an unscored portion of partially circumferentially scored tubing including means for transporting the tubing along a predetermined path, first and second conductors positioned above the path, the second conductor being more closely adjacent the path than the first conductor, the second conductor being normally bowed concavely toward the path, the first conductor including a multiturn coil portion, a severing blade carried by the second conductor and guide means guidably receiving the severing blade for guiding movement thereof normally toward and away from the predetermined path whereby the severing blade is driven toward the predetermined path under the influence of repelling forces established by opposite current flow through the conductors and unscored portions of the partially circumferentially scored tubing are severed to separate the tubing into discrete can bodies.

A further object of this invention is to provide a novel apparatus of the character described wherein the multiturn coil portion includes spaced parallel portions adapted for the passage of current flow in opposite directions, and the second conductor underlies one of the parallel portions whereby current flows in opposite directions in the one parallel portion and the second conductor to establish repelling forces for urging the second conductor and the severing blade toward the predetermined path of tubing travel.

Still another object of this invention is to provide a novel apparatus of the type described, and in addition, to provide means for mounting the severing blade for pivotal movement in the direction of travel of the tubing along the predetermined path.

A further object of this invention is to provide a novel apparatus including each of the elements heretofore described, and in addition, to provide means for increasing or decreasing the concavely bowed configuration of the second conductor to respectively increase and decrease the spring loading thereof.

With the above, and other objects in view that will hereinafter appear the nature of the invention will be more clearly understood by reference to the following detailed description, the appended claims and the several views illustrated in the accompanying drawings.

In the drawings:

FIGURE 1 is a fragmentary top perspective view of a novel magnetic severing apparatus constructed in accordance with this invention, and illustrates a severing blade carried by a lowermost one of a pair of conductors in a position above a partially circumferentially scored tube being conveyed through the apparatus.

FIGURE 2 is a reduced end elevational view of the apparatus of FIGURE 1, and illustrates the generally bowed configuration of a lowermost one of the conductors, and illustrates in phantom outline the severing blade cutting an unscored portion of the tubing.

FIGURE 3 is an enlarged vertical sectional view taken along line 3—3 of FIGURE 2, and more clearly illustrates a multiturn portion of the second conductor forming a coil overlaying the lower first conductor whereupon opposite directions of current flow are established in the conductors to repel the conductor carrying the severing blade downwardly toward the tubing.

FIGURE 4 is an enlarged fragmentary bottom view taken along line 4—4 of FIGURE 2, and more clearly illustrates the construction of the multiturn coil portion of the uppermost conductor and means for guiding the severing blade during a severing operation.

A novel apparatus constructed in accordance with this invention is best illustrated in FIGURE 1 of the drawing, and is generally referred to by the reference numeral 10. The apparatus 10 includes a support base or platform 11 upon which is secured, as by welding, a pair of transversely spaced mounting blocks 12 and 13. A pair of cylindrical generally parallel bars 14 and 15 are secured in respective openings 16, 16 in each of the mounting blocks 12 and 13. The cylindrical bars 14 and 15 are normally spaced slightly above the upper surface (unnumbered) of the base 11, as is best illustrated in FIGURE 2 of the drawings.

Adjustable bracket support means generally referred to by the reference numeral 19 are supported on the rods 14, 15 by a pair of substantially identical adjustable blocks 17, 18. The adjustable blocks 17 and 18 include identical bores 20, 21 slidably receiving the respective rods 14, 15. A headed bolt 22 is received in a threaded bore (not shown) in the block 17 and bottoms against the rod 14 to secure the block 17 in any desired position of adjustment. An identical headed bolt 23 is similarly threaded in a threaded bore (also not shown) in the block 18 for bearing engagement against the rod 14 to adjustably secure the block 18 in any selected position of adjustment.

A cylindrical supporting leg 24 is secured to the block 17, as for example, by welding and projects vertically upwardly as viewed in FIGURES 1 and 2 of the drawings. An identical cylindrical vertical supporting leg 25 is secured to the adjustable block 18. The supporting legs 24 and 25 are in a common vertical plane which is substantially normal to the axis of a generally continuous metallic tube or tubing T.

First conducting means 26 is supported adjacent and above the predetermined path of travel of the tubing T by an identical bracket 27 secured to each of the supporting legs 24, 25. Each of the supporting brackets 27 comprises a first body portion 28 and a second body portion 30. The first and second body portions 28, 30 include respective opposing angular jaws 31, 32 between which are received the first conducting means 26. A pair of identical headed bolts 33 pass freely through bores (not shown) in the first bodies 28 and are received in aligned threaded bores (not shown) in the respective bodies 30 of each of the brackets 27. The angular jaws 31, 32 of each of the brackets 27 clampingly engage the conducting means 26 by securely fastening the headed bolts 33 in the second bodies of each of the brackets 27 in a manner clearly illustrated in FIGURE 1 of the drawings.

Each of the supporting legs 24, 25 is slidably received in a vertical bore (not shown) in a respective one of the second bodies 30 of the brackets 27. A fastening device or screw 34 is threadably received in a threaded bore (not shown) in each of the first bodies 28 and passes through an aligned unthreaded bore (not shown) in the second bodies 30, and bottoms against the respective supporting legs 24 and 25. When the screws 34 are loosened the brackets 27 can be shifted upwardly or downwardly as viewed in FIGURES 1 and 2 of the drawings to adjust the position of the first conducting means 26 and vary the internal loading thereof as will appear more fully hereafter.

The first conducting means 26 is in the form of a beam or bar which is concavely bowed toward the tubing T and the predetermined path of travel thereof, as is best illustrated in FIGURE 2 of the drawings. Severing means 35 is secured to and carried by a centermost portion 36 of the first conductor 26 for downward movement therewith upon the deflection of the centermost portion 36 to a generally horizontal position (phantom lines in FIGURE 2) in a manner to be described more fully hereafter. The severing means 35 includes a severing blade 37 terminating in a sharpened edge (unnumbered). The severing blade 37 is pivotally supported by a pivot pin 38 (FIGURE 3) in a generally vertical slot 40 of a member 41 welded or otherwise conventionally secured to the centermost portion 36 of the first conductor 26. The member 41, as well as the shearing blade 37 carried thereby is guided during downward and upward vertical movement by guide means 42 which includes a generally U-shaped member 43 secured to a crossbar 44. The crossbar 44 has vertical bores 45, 46 at opposite end portions thereof through which are slidably received a respective cylindrical rod 47, 48. Lower end portions of the rods 47, 48 terminate in base plates 50, 51 respectively which are secured to the base 11 by conventional bolts 52. The crossbar 44 is secured in a selected vertical position by means of bolts 53 which draw together bifurcated end portions (unnumbered) of the crossbar 44 in a manner clearly illustrated in FIGURE 4 of the drawings.

The generally U-shaped member 43 of the guide means 44 includes a pair of arms 54, 55 having transversely aligned vertical slots 56, 57 respectively. A narrow guide member 58 secured to the member 41 of the shearing means 35 is slidably and guidably received in the guide slot 56 while a similar narrow guide member 60 carried by the member 41 of the guide means 35 is similarly slidably and guidably received in the slot 56 of the arm 55 (FIGURE 4).

As is best illustrated in FIGURE 2 of the drawings, the centermost portion 36 of the first conductor 26 is normally spaced above the U-shaped member 43 of the guide means 42, and is maintained in this position by the normal springiness or flexure of the material from which the first conductor 26 is constructed, which material is preferably spring steel or similar highly flexible metallic material. In this position of the first conductor 26 (FIGURE 3) the severing edge (unnumbered) is spaced slightly above the tubing T in the area of a longitudinal seam S. Upon the downward deflection of the centermost portion 36 of the first conductor 26 in a manner to be described more fully hereafter, the centermost portion 36 deflects downwardly to the phantom outline position shown in FIGURE 2 of the drawing causing downward movement of the severing blade 37 and the severing of unscored portions U across the longitudinal seam S at each of a plurality of partial circumferential score lines P in the exterior surface of the tubing T to sever the tubing T into individual can bodies (not shown). The downward movement of the severing blade 37 is limited by the abutment between the centermost portion 36 of the first conductor 26 and the upper surfaces (unnumbered) of the arms 54, 55 of the generally U-shaped member 43.

The first conductor 26 is urged downwardly in the manner just described by its cooperative association with second conductor means 62. The second conductor means 62 includes a base plate or cross bar 63 having end portions 64, 65 secured in respective identical brackets 66, 67 supported above the brackets 27 carried by the associated vertical supporting legs 24, 25.

Each of the brackets 66, 67 is identical and includes a bifurcated body 68 provided with a vertical bore 70 which receives associated ones of the supporting legs 24 and 25. A bolt (not shown) draws the bifurcated portions of the bodies 68 into clamping engagement with the supporting legs 24, 25 in a manner identical to that described in relation to the rods 47, crossbar 44 and bolts 53 (FIGURE 4), and a further description is deemed unnecessary for a complete understanding of this invention.

Each of the brackets 67 and 68 includes an upper arm 72 and a lower arm 73 between which are received the respective end portions 64, 65 of the crossbar 63. A screw 74 threadably received in an opening (unnumbered) in each of the arms 72 secures the end portions 64, 65 of the crossbar 63, as well as other elements yet not described between the arms 72, 73 of the respective brackets 66, 67.

A second conductor 75 of the second conducting means 62 includes an end portion 76 (FIGURE 2) spaced from the lower arm 73 of the bracket 66 by a block of insulating material 77 and similarly spaced from the end portion 64 of the crossbar 63 by a similar block of insulating material 78. An opposite end portion 80 of the second conductor 75 is received between the arms 72, 73 of the bracket 67. The end portion 80 is separated from the end portion 65 of the crossbar 63 by a block of insulating material 81 while a block of insulating material 82 separates the end portion 80 from the lower arm 73. A centermost portion of the second conductor 75 includes a multiturn coil 83 having a pair of parallel portions 84 and 85. The parallel portion 85 of the coil 83 overlies the centermost portion 36 of the first conductor 26, as is best illustrated in FIGURES 3 and 4 of the drawings.

The end portion 76 of the second conductor 75 is connected to a conventional electrical system (not shown) which preferably includes a discharge capacitor for generating extremely high current impulses which are conducted by the end portion 76 of the conductor 75 through the parallel portions of the coil 83 in the direction of the headed arrows in FIGURE 4. The conductor 26 provides a return path for the current flow by means of the electrical connection formed by a metallic sleeve 86 (FIGURE 1) secured between the end portion 80 of the conductor 75 and the conductor 26. It should be particularly noted that the direction of current flow in the portion 85 of the coil 83 of the conductor 75 and in the conductor 26 are in opposite directions resulting in a repulsive force between the conductors in a direction generally normal to their lengths. This force of repulsion drives the centermost portion 36 of the conductor 26 downwardly in the manner heretofore described to sever the unscored or tab portions U of the tubing T.

The repulsive force is of a relatively short duration and for practical consideration may be assumed to be an impulse. Thus, the deflection of the centermost portion 36 of the conductor 26 is a function of the impulse and the natural frequency of the conductor 26 which is, as was heretofore described, in the form of a bar or beam curved concavely with respect to the path of travel of the tube T. This concave configuration of the conductor 26 permits the conductor to oscillate after the initial large displacement of the severing blade 37 during the severing of the unscored portions U of the tubing T. That is, after the unscored portions U have been severed, the centermost portion 36 of the conductor 26 returns to the concavely curved position at which the residual oscillations are maintained at a minimum and counteracted by the relatively high potential energy of the conductor 26.

An important feature of this invention is the positive stop of the centermost portion 36 of the conductor 26 by the abutment thereof with the upper faces (unnumbered) of the arms 54, 55. This positive stoppage of the centermost portion 36 and the severing means 35 carried thereby generates impact forces which quickly reverse the downward motion of the severing blade 37 and create a substantially instantaneous reversal in an upward direction of the severing blade 37. Such a quick reversal of the motion of the severing blade 37 is extremely important since the shorter the time the severing blade is in contact with the tubing T moving along the predetermined path by, for example, a conventional conveyor C, the less is the damage that may be inflicted upon the tubing T during the severing thereof.

Even under optimum conditions of synchronism between the downward movement of the severing means 35 and the movement of the tubing T, the tubing T has a tendency to move the severing blade 37 in the direction of travel of the tubing T while the severing blade 37 is in contact with the tubing. While this time of contact is extremely slight and successful shearing of the tubing T is accomplished by the apparatus 10, the pivotal connection of the shearing blade 37 to the member 41 (FIGURE 3) permits limited clockwise pivotal motion of the shearing blade 37 during the contact of the blade with the tubing T to, in effect, reduce or substantially eliminate the damage which might otherwise be inflicted by the mismatch of velocity between the tubing T and the shearing blade 37.

The high velocity achieved by the apparatus 10 is important for several reasons. First, the higher the impact velocity of the shearing blade 37 against the tubing T the more effective are the inertia forces on the tubing T. That is, the tubing T reacts in a more rigid manner to high velocity impact shearing forces than to low velocity impact forces, thus resulting in a clear cut across the tabs U of the longitudinal seam S. Secondly, as was heretofore noted, the higher the velocity of the shearing blade 37 the shorter the time period of contact between the blade 37 and the tubing T with the resultant reduction of material damage.

From the foregoing, it will be seen that novel and advantageous provisions have been made by carrying out the desired end. However, attention is again directed to the fact that additional variations may be made in this invention without departing from the spirit and scope thereof as defined in the appended claims.

We claim:

1. Apparatus for severing a portion of continuous partially circumferentially scored tube comprising means for supporting a generally continuous tube which includes partial circumferential scored portions, means deflectable toward the tube, and severing means operable upon the deflection of said deflectable means to sever unscored portions of the tube between each partial scored portion whereby a tube portion of the tube is completely severed.

2. Apparatus for severing a portion of partially circumferentially scored tube comprising means for supporting a generally continuous tube which includes partial circumferential scored portions, means for conducting current in a first direction, means for conducting current in a second direction whereby one of said conducting means is movable relative to the other of said conducting means, and cutting means operative to sever unscored portions of the tube between each partial scored portion upon the movement of said one conducting means whereby a tube portion of the tube is completely severed.

3. Severing apparatus comprising means for conducting current in a first direction, means for conducting current in a second direction and severing means operable by relative movement between said conducting means upon current passage therethrough.

4. Severing apparatus comprising means for conducting current in a first direction, means for conducting current in a second direction opposite to the first current direction, and severing means operable by relative movement between said conducting means upon current passage therethrough.

5. Severing apparatus comprising first means for conducting current in a first direction, second means for conducting current in a second direction opposite to the first current direction, said second conducting means being normally positioned adjacent said first conducting means in a first position and remote from said first conducting means in a second position, and severing means operable by said first conducting means during the movement thereof between said first and second positions upon current flow in said first and second directions.

6. Severing apparatus comprising first means for conducting current in a first direction, second means for conducting current in a second direction opposite to the first current direction, said first conducting means being deflectable between a first position adjacent said second conducting means and a second position remote from said second conducting means, and severing means movable by said first conducting means during the deflection thereof between said first and second positions upon current flow in said first and second directions.

7. Apparatus for severing an unscored portion of a partially circumferentially scored tube comprising means for supporting the tube, means for conducting current in a first direction, means for conducting current in a second direction whereby forces are created for moving said conducting means relative to each other, severing means operable by the relative movement between the conducting means upon current passage therethrough, and guide means for guiding the severing means during the operation thereof.

8. Apparatus for severing an unscored portion of a partially circumferentially scored tube comprising means for supporting the tube, means for conducting current in a first direction, means for conducting current in a second direction whereby forces are created for moving said conducting means relative to each other, severing means means mounting said severing means for movement upon the relative movement of said conducting means, and means freely pivotally joining said severing means to said mounting means.

9. Apparatus for severing an unscored portion of partially circumferentially scored tubing comprising means for transporting the tubing along a predetermined path, first and second conductors positioned adjacent said path, a severing means, and means mounting said severing means for movement normal to said predetermined path and in alignment with said second conductors whereby upon the passage of current through said conductors said second conductor drives said severing means normally toward said predetermined path thereby severing the unscored portion of the tubing transported along said path.

10. Apparatus for severing an unscored portion of partially circumferentially scored tubing comprising means for transporting the tubing along a predetermined path, first and second conductors positioned above and adjacent said predetermined path, said first conductor being more closely adjacent said path that said second conductor, severing means carried by said first conductor and guide means for guiding said severing means normally toward said predetermined path upon the movement of said first conductor under the influence of repelling forces established by current flow through said conductors.

11. The apparatus as defined in claim 10 including means mounting said severing means for pivotal movement in the direction of travel of the tubing along the predetermined path.

12. The apparatus as defined in claim 10 wherein said first conductor is normally bowed concavely toward the predetermined path.

13. Apparatus for severing an unscored portion of partially circumferentially scored tubing comprising means for transporting the tubing along a predetermined path, first and second conductors positioned above said path, said first conductor being more closely adjacent said path than said second conductor, said first conductor being normally bowed concavely toward the path, said second conductor including a multiturn coil portion, a severing blade carried by the first conductor, and guide means receiving the severing blade for guiding movement normally toward and away from said path.

14. The apparatus as defined in claim 13 including means for adjusting the position of said first conductor relative to said predetermined path.

15. The apparatus as defined in claim 13 including means for increasing or decreasing the concavely bowed configuration of said first conductor to respectively increase and decrease the spring loading thereof.

16. The apparatus as defined in claim 13 wherein said multiturn coil portion includes spaced parallel portions adapted for the passage of current flow in opposite directions, and said first conductor underlies one of said parallel portions.

17. The apparatus as defined in claim 13 wherein means are provided for adjusting said guide means toward and away from the predetermined path.

18. Apparatus for forcibly urging an element into contact with an article during a manufacturing process comprising first means for conducting current in a first direction, second means for conducting current in a second direction opposite said first direction, means supporting said first and second means adjacent each other whereby current flows in opposite directions through said first and second means creates forces for relatively repelling movement between said first and second means, and element means carried by said second means whereby said element means contacts an article upon the relative movement between the first and second means.

19. The apparatus as defined in claim 18 wherein said second conducting means is bowed convexly toward the first conducting means.

20. Severing apparatus comprising means for conducting current in a first direction, means for conducting current in a second direction, severing means operable by relative movement between said conducting means upon current passage therethrough and stop means for abruptly stopping the relative movement between said conducting means.

21. Severing apparatus comprising cutting means for cutting a member, support means for supporting the member adjacent the cutting means, deformable means for moving the cutting means from a first position spaced from the member to a second position at which the cutting means contacts and severs the member, and means for causing said deformable means to deformably move between said first and second positions.

References Cited by the Examiner
UNITED STATES PATENTS

| | | | |
|---|---|---|---|
| 2,984,138 | 5/1961 | Vitense et al. | 83—337 X |
| 2,997,904 | 8/1961 | Gotsch et al. | 83—54 X |

WILLIAM S. LAWSON, *Primary Examiner.*